(12) United States Patent
Rubner et al.

(10) Patent No.: US 11,933,266 B2
(45) Date of Patent: Mar. 19, 2024

(54) METHOD FOR INSTALLING ROTOR BLADES OF A WIND TURBINE

(71) Applicant: Wobben Properties GmbH, Aurich (DE)

(72) Inventors: Florian Rubner, Aurich (DE); Klaas Schumann, Hage (DE); Felix Fettback, Stelle (DE); Wolfgang Meyer-Stöver, Wiesmoor (DE); Frank Knoop, Aurich (DE); Klaus Bünting, Aurich (DE); Frank Zimmermann, Emden (DE); Martin Hüller, Grossefehn (DE); Thomas Rehberger, Grossefehn (DE)

(73) Assignee: Wobben Properties GmbH, Aurich (DE)

(*) Notice: Subject to any disclaimer, the term of this patent is extended or adjusted under 35 U.S.C. 154(b) by 187 days.

(21) Appl. No.: 17/440,152

(22) PCT Filed: Mar. 18, 2020

(86) PCT No.: PCT/EP2020/057376
§ 371 (c)(1),
(2) Date: Sep. 16, 2021

(87) PCT Pub. No.: WO2020/187959
PCT Pub. Date: Sep. 24, 2020

(65) Prior Publication Data
US 2022/0145859 A1     May 12, 2022

(30) Foreign Application Priority Data
Mar. 19, 2019 (DE) ................. 10 2019 106 969.6

(51) Int. Cl.
*F03D 13/10* (2016.01)
*B66C 1/10* (2006.01)
(Continued)

(52) U.S. Cl.
CPC .............. *F03D 13/10* (2016.05); *B66C 1/108* (2013.01); *B66C 13/08* (2013.01); *F03D 1/0658* (2013.01);
(Continued)

(58) Field of Classification Search
CPC ......... F03D 13/10; F03D 1/0658; Y02E 10/72
See application file for complete search history.

(56) References Cited

U.S. PATENT DOCUMENTS 7,165,941 B2   1/2007   Wobben
7,353,603 B2*   4/2008   Wobben ................ F03D 1/0658
                                                                                                   29/889.3

(Continued)

FOREIGN PATENT DOCUMENTS

DE   20 2014 105 459 U1   3/2016
EP   1 597 477 B1   4/2010
(Continued)

*Primary Examiner* — Pedro J Cuevas
(74) *Attorney, Agent, or Firm* — Seed IP Law Group LLP

(57) ABSTRACT

Thus there is provided a method of installing rotor blades of a wind turbine to a rotor hub of the wind turbine. The wind turbine has a tower having a tower longitudinal axis. The rotor hub has a first, a second and a third rotor blade connection. The rotor hub is rotated until the first rotor blade connection is at an angle of 90° or 270° with respect to the tower longitudinal axis. The first rotor blade is lifted substantially horizontally and fixed to the rotor blade connection. The rotor hub is rotated so that the second rotor blade connection is at an angle of 90° or 270° with respect to the tower longitudinal axis. The second rotor blade is lifted substantially horizontally and fixed to the second rotor blade connection. The rotor hub is further rotated until the third rotor blade connection is at an angle of 60° or 300° with respect to the tower longitudinal axis. The third rotor blade (Continued)

is lifted at an angle of α=30° with respect to a horizontal and fixed to the third rotor blade connection.

2 Claims, 11 Drawing Sheets

(51) Int. Cl.
    *B66C 13/08*     (2006.01)
    *F03D 1/06*     (2006.01)

(52) U.S. Cl.
    CPC ..... *F05B 2230/604* (2013.01); *F05B 2230/61* (2013.01)

(56) References Cited

U.S. PATENT DOCUMENTS

| | | | |
|---|---|---|---|
| 8,083,212 B2 * | 12/2011 | Numajiri | B66C 1/108 416/142 |
| 9,669,497 B2 * | 6/2017 | Gabeiras | F03D 1/0658 |
| 9,810,202 B2 * | 11/2017 | Falkenberg | F03D 1/0658 |
| 9,926,907 B2 * | 3/2018 | Hoffmann | F03D 13/10 |
| 10,822,207 B2 * | 11/2020 | Lopez-Benedito | B66C 13/16 |
| 10,823,149 B2 * | 11/2020 | Knoop | B66C 1/108 |
| 11,692,525 B2 * | 7/2023 | Nies | F03D 13/10 29/889.1 |
| 2006/0147308 A1 * | 7/2006 | Wobben | F03D 1/0658 416/132 B |
| 2010/0028152 A1 * | 2/2010 | Numajiri | B66C 1/108 29/889 |
| 2010/0139062 A1 * | 6/2010 | Reed | F03D 13/10 29/889.1 |
| 2013/0318789 A1 * | 12/2013 | Gabeiras | F03D 1/0658 29/889.7 |
| 2015/0275853 A1 * | 10/2015 | Canedo Pardo | F03D 80/88 29/889 |
| 2015/0368075 A1 | 12/2015 | Clymans | |
| 2016/0354879 A1 * | 12/2016 | Gabeiras | F03D 13/10 |
| 2018/0362306 A1 * | 12/2018 | Lopez-Benedito | F03D 13/10 |
| 2019/0309730 A1 * | 10/2019 | Knoop | B66C 13/06 |
| 2020/0072187 A1 * | 3/2020 | Nies | F03D 1/0658 |
| 2020/0072188 A1 * | 3/2020 | Neumann | F03D 1/0658 |
| 2021/0102526 A1 * | 4/2021 | Siebelts | F03D 1/0658 |
| 2022/0055867 A1 * | 2/2022 | Jepsen | B66C 1/108 |

FOREIGN PATENT DOCUMENTS

| | | | | | |
|---|---|---|---|---|---|
| EP | 2924283 A1 | * | 9/2015 | ............ | F03D 1/001 |
| EP | 3 001 030 A1 | | 3/2016 | | |
| KR | 20140001637 A | | 1/2014 | | |
| KR | 101400205 B1 | | 5/2014 | | |
| WO | 03/012291 A1 | | 2/2003 | | |
| WO | 2019/001665 A1 | | 1/2019 | | |
| WO | WO-2020047104 A1 | * | 3/2020 | ............ | F03D 1/0658 |
| WO | WO-2020047112 A1 | * | 3/2020 | ............ | F03D 1/0658 |

* cited by examiner

METHOD FOR INSTALLING ROTOR BLADES OF A WIND TURBINE

BACKGROUND

Technical Field

The present invention concerns a method of installing rotor blades of a wind turbine.

Description of the Related Art

The erection of a wind turbine typically firstly involves erection of the tower and then a nacelle can be fixed on the tower and the rotor blades can be fixed to a rotor hub of the nacelle. As an alternative thereto the rotor hub together with the rotor blades fixed thereto can be pulled upwardly and fixed to the nacelle.

EP 1 597 477 B1 describes a method of installing rotor blades to a rotor hub of a wind turbine. For that purpose the rotor hub is rotated to a predetermined first position (03:00 hour position or 09:00 hour position) and a first rotor blade is fixed to the rotor hub. The rotor hub is then rotated by means of the first rotor blade (with the aid of the force of gravity) into a predetermined second position so that the second rotor blade can be pulled upwardly ($\alpha=0°$) and can be fixed to the rotor hub in a 03:00 hour position or 09:00 hour position. Before the second rotor blade is fixed to the hub the nacelle is rotated through 180°. The rotor hub can then be rotated into a further predetermined position by means of the second rotor blade. The nacelle can in turn be rotated through 180° and the third rotor blade can be fixed in position.

WO 2003/012291 A1 describes a method of installing rotor blades of a wind turbine. During installation of the rotor blades a weight can be releasably mounted to a flange of the rotor hub. The rotor hub is rotated into a predetermined position and the rotor blades of the wind turbine can be fixed to the hub by the releasable weights being removed and the rotor blades being fitted to the hub. The ever increasing length of the rotor blades means that installation as described above is becoming more and more difficult.

On the German patent application from which priority is claimed the German Patent and Trade Mark Office searched the following documents: DE 20 2014 105 459 U1, US 2015/0368075 A1, EP 1 567 477 B1 and WO 2003/012 291 A1.

BRIEF SUMMARY

Provided is a method of installing rotor blades of a wind turbine, which allows installation even of very long rotor blades.

Thus there is provided a method of installing rotor blades of a wind turbine to a hub of the wind turbine. The wind turbine is to have three rotor blades and the hub has three blade connections which are respectively displaced with respect to each other through 120°. A first blade connection of the hub is rotated into a 15:00 hour position (that is to say at an angle of 90° with respect to a tower longitudinal axis) or into a 21:00 hour position (that is to say 270°). A first rotor blade can then be lifted substantially horizontally and fixed to the first blade connection. A second blade connection of the hub is rotated into a 15:00 hour position (90°) or into a 21:00 hour position, that is to say at an angle of 270°. That is effected for example by means of the force of gravity acting on the first rotor blade at the first blade connection. In that case the first rotor blade is let down to 19:00 hour or 17:00 hour position (rotor angle 210° or 150°). The second rotor blade can then be again lifted upwardly substantially horizontally and fixed to the second blade connection or the second connection on the rotor hub. The rotor hub is then rotated in such a way that the third rotor hub connection or rotor blade connection is in the 14:00 hour position (that is to say 60°) or a 22:00 hour position (that is to say 300°). The third rotor blade is then lifted upwardly by means of a crane in a lift angle of for example 30° and then fixed to the second rotor blade connection.

While in the state of the art the rotor blades are lifted horizontally and the rotor hubs are rotated in such a way that a free rotor blade connection is in a 15:00 or 21:00 hour position to fix the substantially horizontally oriented rotor blade thereto, the third rotor blade is lifted upwardly at a lift angle of for example 30° relative to a horizontal and fixed to a blade connection which is in the 14:00 hour position or in the 22:00 hour position.

To achieve that the rotor blade has to be lifted in a lift angle of >0°, that is to say for installation the rotor blade is lifted without being disposed substantially horizontally.

By virtue of the rotor blade being lifted in a lift angle of >0° and by rotation of the third rotor blade connection to a 14:00 hour position or a 22:00 hour position the crane can be relieved of load as the rotor hub cannot be rotated to a 15:00 hour position. That could result in the tolerable forces being exceeded.

The method and the fact of dispensing with a ballast arm with fitment and removal of the ballast arm mean that the construction time and thus the costs for the wind turbine can be considerably reduced. In addition this eliminates transportation and fitment of the ballast arms to and at the building site.

The method is particularly advantageous in relation to wind turbines which involve a nacelle height of >100 m (meters) and/or a rotor blade length of >50 m.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
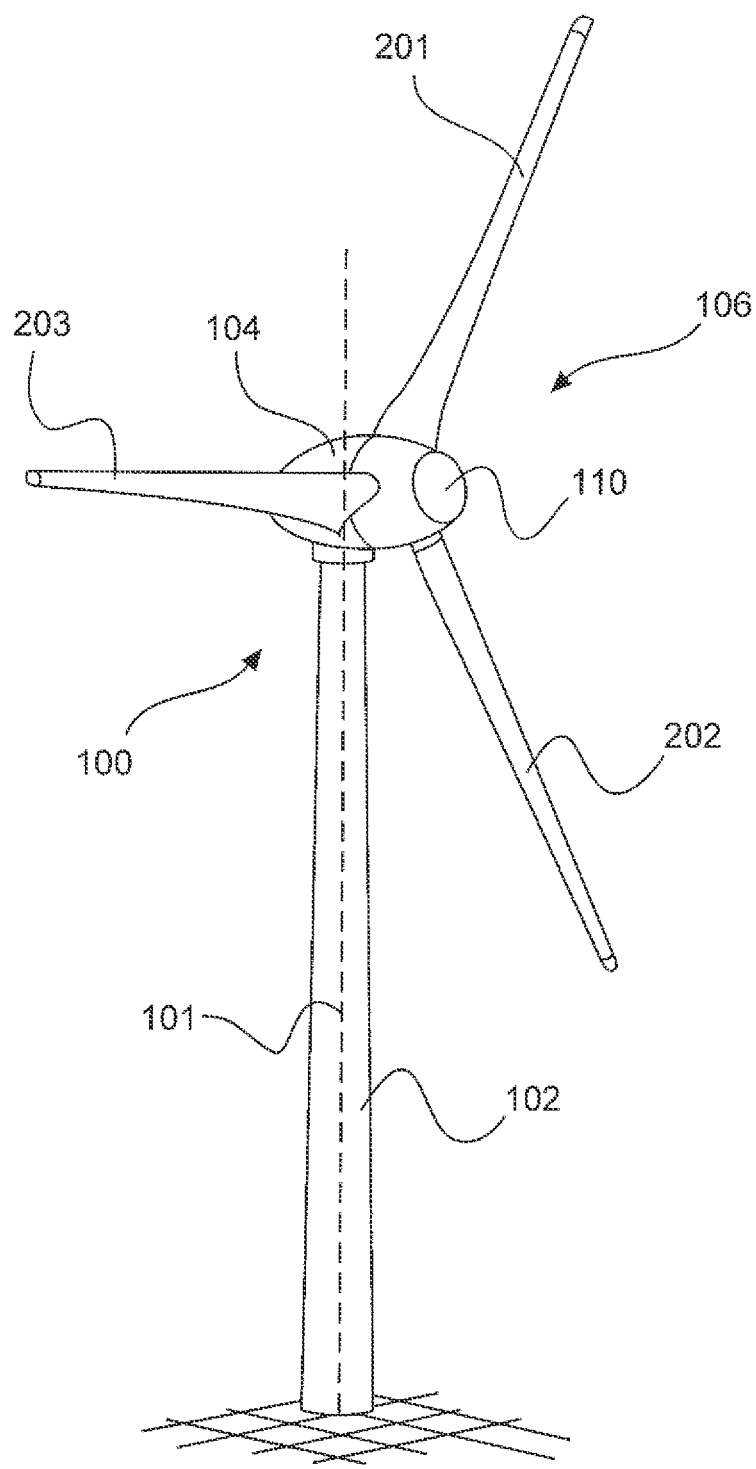
FIG. 1 shows a diagrammatic view of a wind turbine according to the invention.

FIG. 1 shows a diagrammatic view of a wind turbine according to the invention. The wind turbine 100 has a tower 102 and a nacelle 104 on the tower 102. The tower 102 has a tower longitudinal axis 101. The nacelle 104 carries an aerodynamic rotor 106 with three rotor blades 201, 202, and 203 and a spinner 110. In operation of the wind turbine the aerodynamic rotor 106 is caused to rotate by the wind and thus also rotates a rotor or rotor member of a generator which is coupled directly or indirectly to the aerodynamic rotor 106. The electric generator is disposed in the nacelle 104 and generates electrical power. The pitch angles of the rotor blades 201-203 can be altered by pitch motors at the rotor blade roots 108b of the respective rotor blades 201-203.

Figure 2:
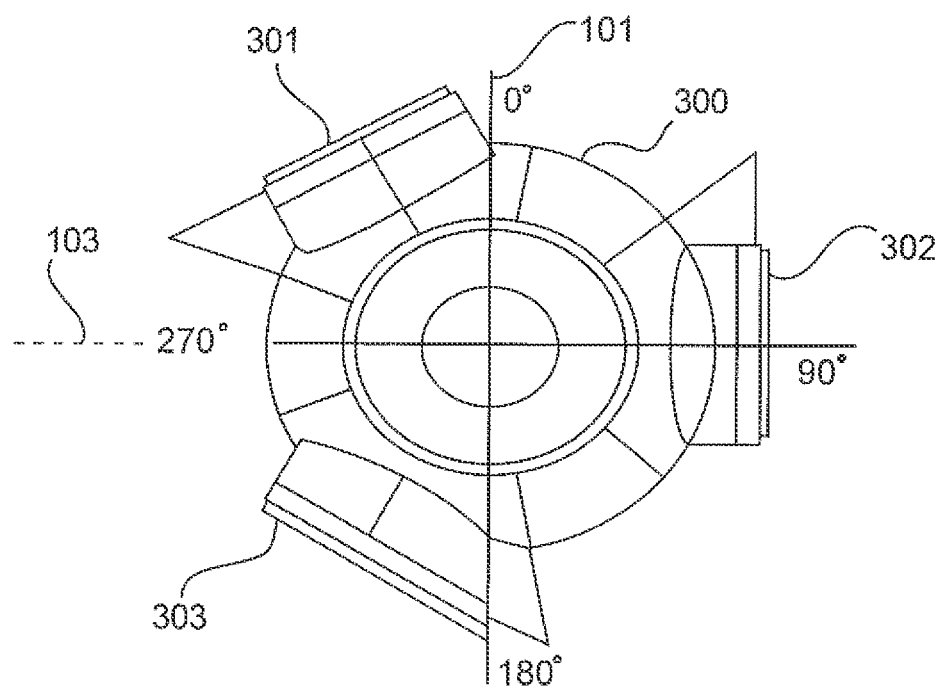
FIG. 2 shows a diagrammatic view of a rotor of the wind turbine in an associated angle system.

FIG. 2 shows a diagrammatic view of a rotor of the wind turbine in an associated angle system. The rotor hub 300 has three rotor blade connections 301, 302, and 303. The three rotor blade connections 301-303 are respectively arranged displaced relative to each other by 120°. FIG. 2 also shows an angle system, wherein the tower longitudinal axis 101 is at 0° (that is to say in the 12:00 hour or 24:00 hour position). 90° with respect to the tower longitudinal axis 101 represents a 03:00 hour or 15:00 hour position, 100° with respect to the tower longitudinal axis 101 represents a 06:00 hour or 18:00 hour position and 270° with respect to the tower longitudinal axis 101 represents a 09:00 hour or 21:00 hour position. The angle system is thus oriented in relation to the rotor in the side view.

FIG. 2 also shows a horizontal 103. That corresponds to the angle 90° or 270°.

Figure 3:
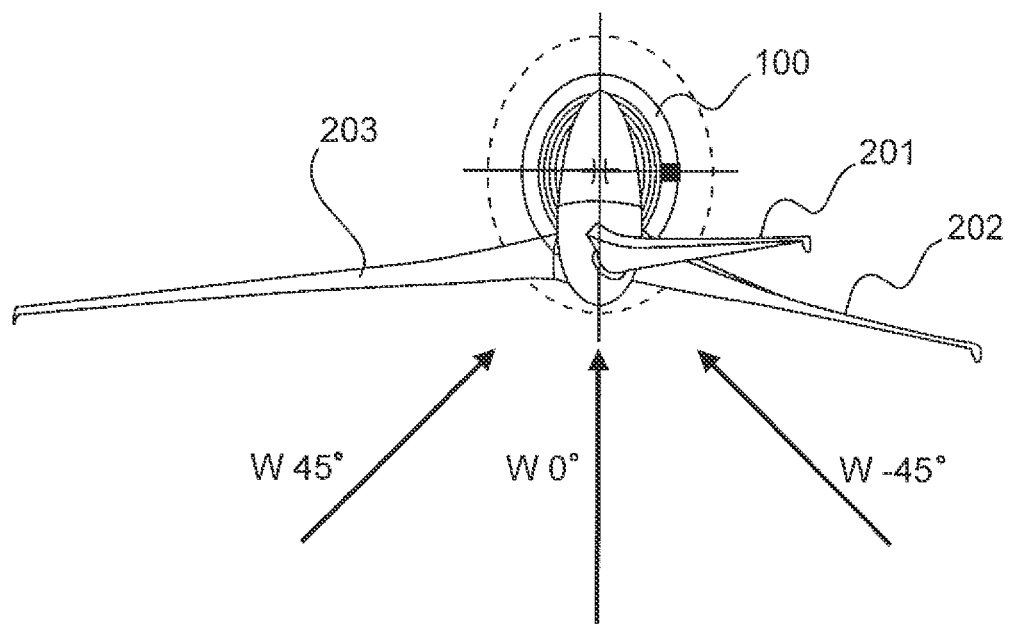
FIG. 3 shows a diagrammatic plan view of a wind turbine.
Figure 4:
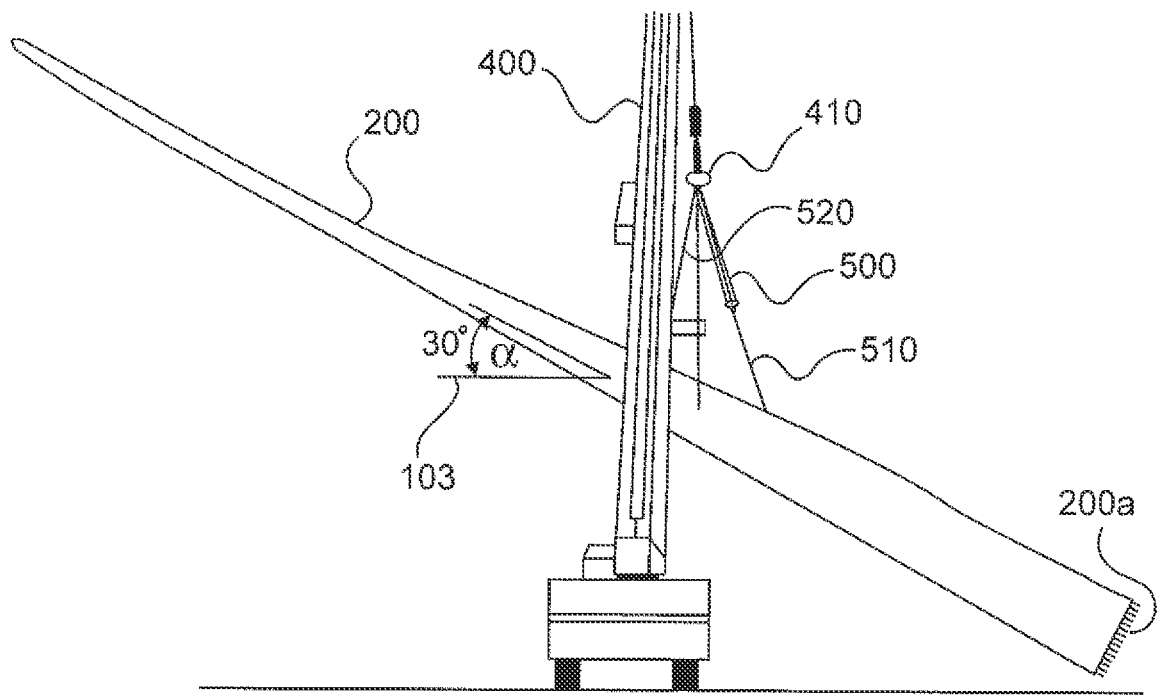
FIG. 4 shows a diagrammatic view of a rotor blade upon installation.

FIG. 3 shows a diagrammatic plan view of a wind turbine. FIG. 3 illustrates a wind turbine according to the invention and various wind directions. The wind turbine 100 has at least three rotor blades 201-203. FIG. 3 shows a wind direction W45, that is to say with +55°, a wind direction θ, that is to say with 0°, and a wind direction −55° W-45. FIG. 4 shows a diagrammatic view of a rotor blade in the installation procedure.

FIG. 4 shows a snapshot upon installation of a rotor blade. According to an aspect of the present invention, the rotor blade is not lifted substantially horizontally as is otherwise usual but is lifted at a lift angle α with respect to a horizontal line 103. That angle α can for example represent 30° with respect to the blade longitudinal axis. The rotor blade 200 can be lifted up by means of a hook crane 410 and a sling or a loop 500. In that case the sling 500 can have two arms 510, 520 which can be of differing lengths so that the rotor blade can be transported upwardly at the desired lift angle.

Figure 5:
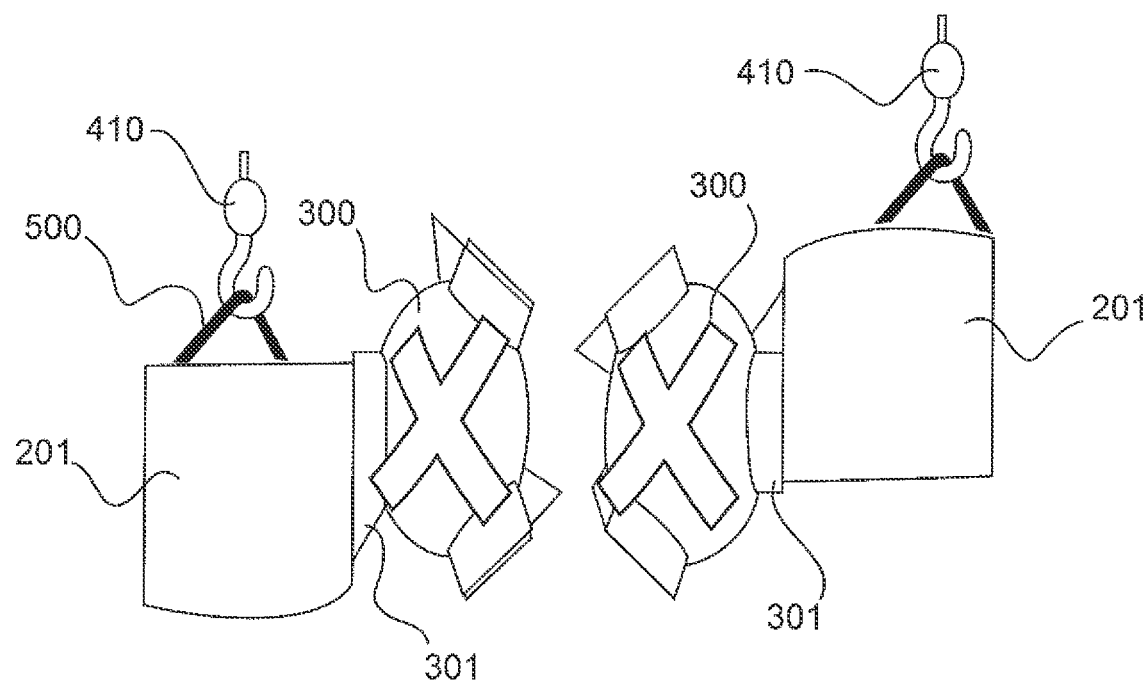
FIG. 5 shows a perspective view of a rotor blade according to an embodiment of the invention, and FIGS. 6 to 23 respectively show a section upon installation of the rotor blades of the wind turbine.

FIGS. 5 to 23 respectively show a diagrammatic view in the respective installation steps for the rotor blades of the wind turbine. FIG. 5 shows a first step S1 in the installation of the rotor blades. The first rotor blade 201 can be lifted substantially horizontally by means of a crane hook 410 on a sling 500 and fixed to a first blade connection 301 on the hub 300. For that purpose the hub 300 is rotated in such a way that the first rotor blade connection 301 is either in the 21:00 hour position or at 270° or in the 03:00 hour position, that is to say at 90°, in the angle system shown in FIG. 2. Installation at 270° is shown at the left in FIG. 6 and installation at 90° is shown at the right in FIG. 6. The first rotor blade 201 is then fixed to the first rotor blade connection 301. In that case the crane hook 410 carries at least a part of the load of the first rotor blade 201.

Figure 6:
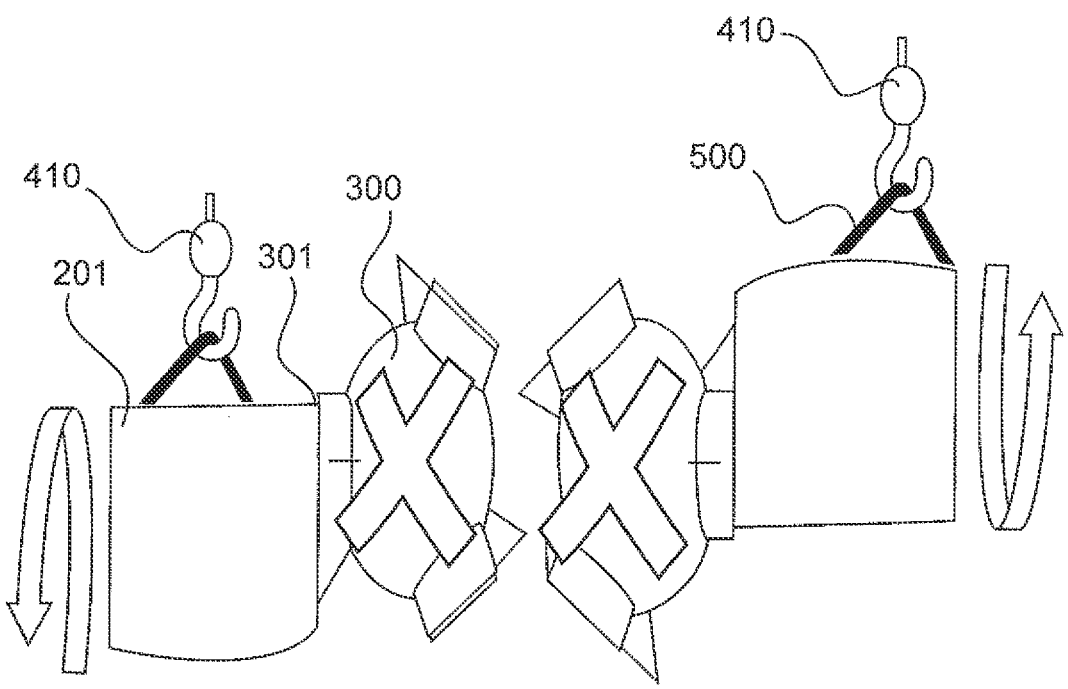

Optionally the first rotor blade 201 can be rotated as shown in FIG. 6 so that all screw means for the rotor blade can be tightened. FIG. 6 can thus represent the second step S2.

Figure 7:
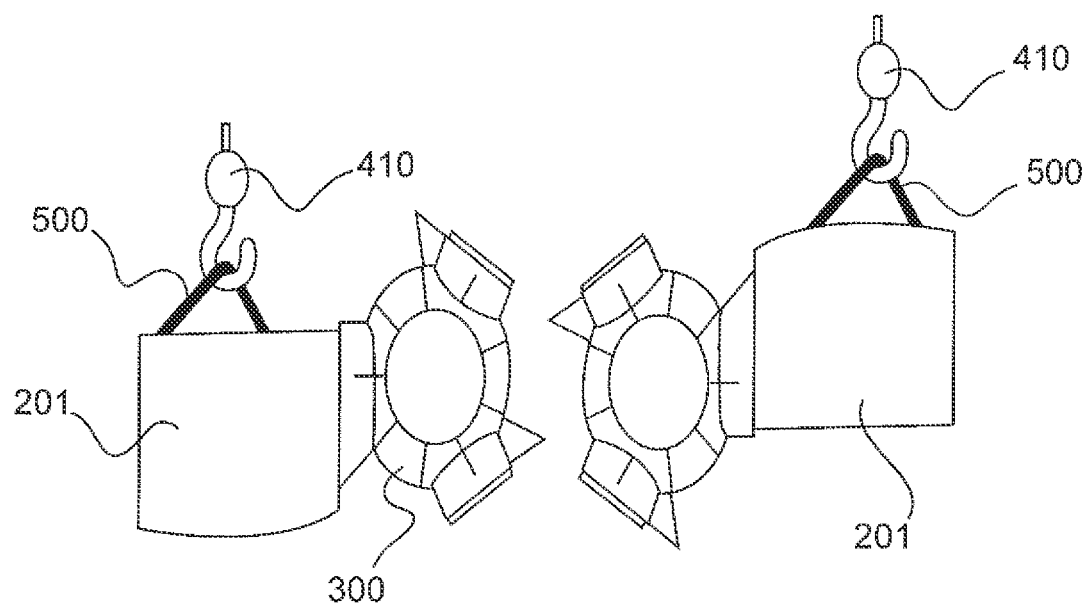

FIG. 7 then shows the fourth step S4. Here the rotor is not arrested and the crane carries at least a part of the load of the first rotor blade.

Figure 8:
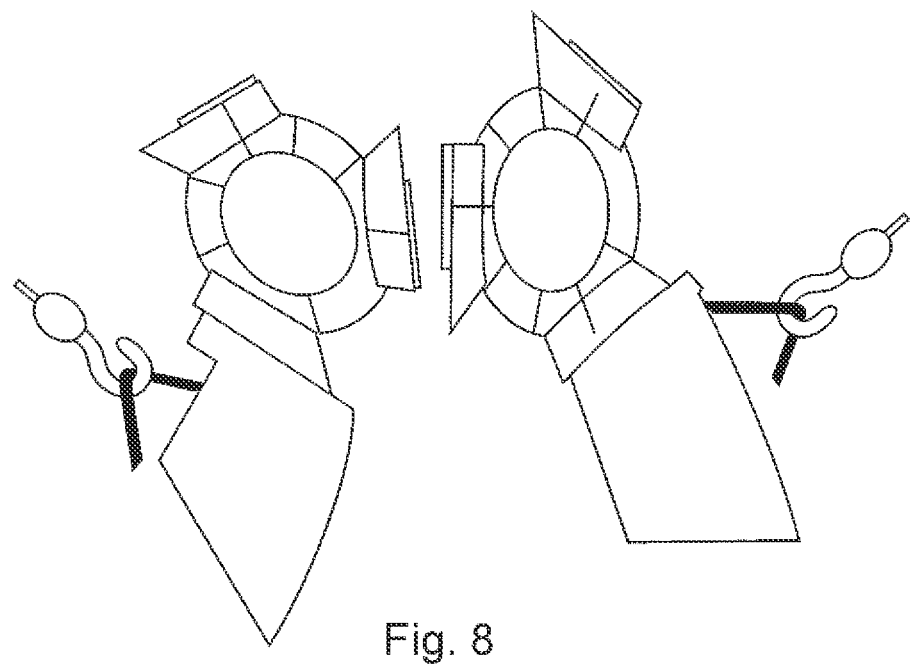

FIG. 8 then represents the fifth step S5 wherein the rotor is partially rotated so that the first rotor blade is at an angle of 150° or 210° or the first rotor blade 201 is in the 19:00 hour or 17:00 hour position in the angle system of FIG. 2.

Figure 9:
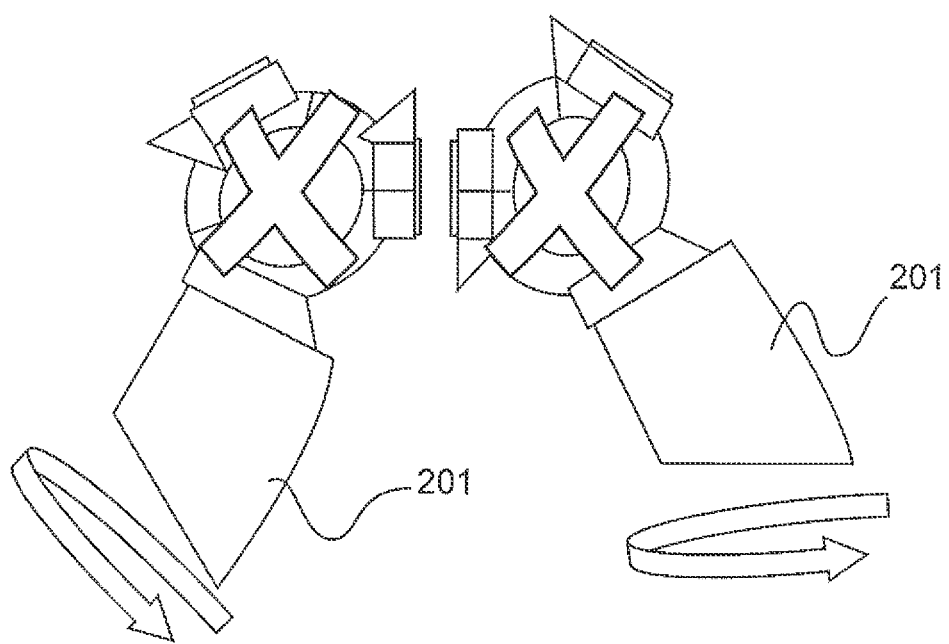
Figure 10:
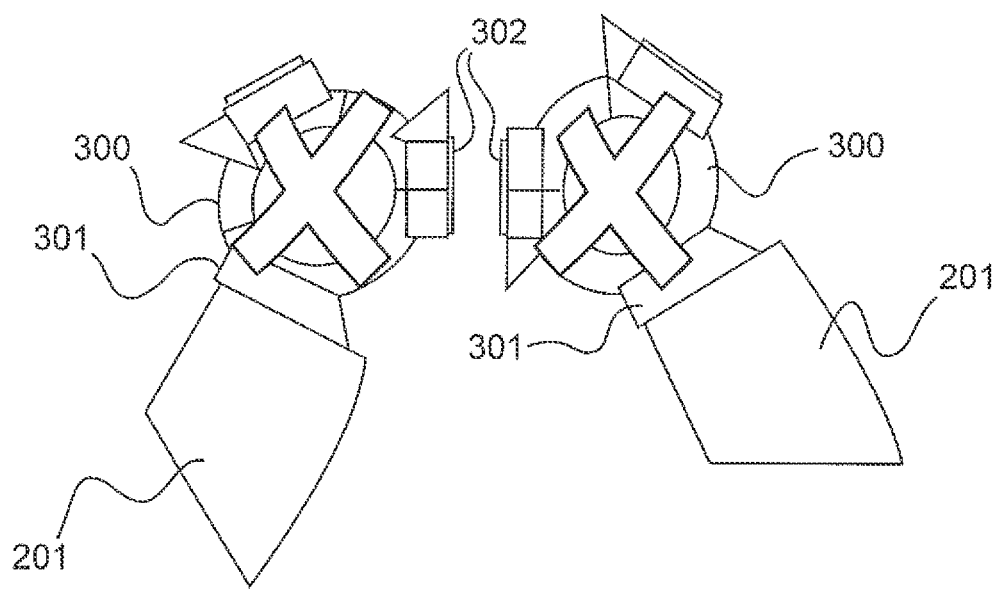

FIG. 9 then shows the sixth step S6 in which the crane hook and the sling have been removed. Optionally the first rotor blade 201 can be further rotated in steps S6 and S7, that is to say as shown in FIG. 9, so that all screw connections can be tightened. In FIG. 10 the first rotor blade is in the defined end position. The first rotor blade 201 is then either at 210° or at 150° or in the 7:00 hour or 5:00 hour position. The second rotor blade connection 302 is then either at 90° or at 270°, that is to say either in the 15:00 hour position or in the 21:00 hour position.

Figure 11:
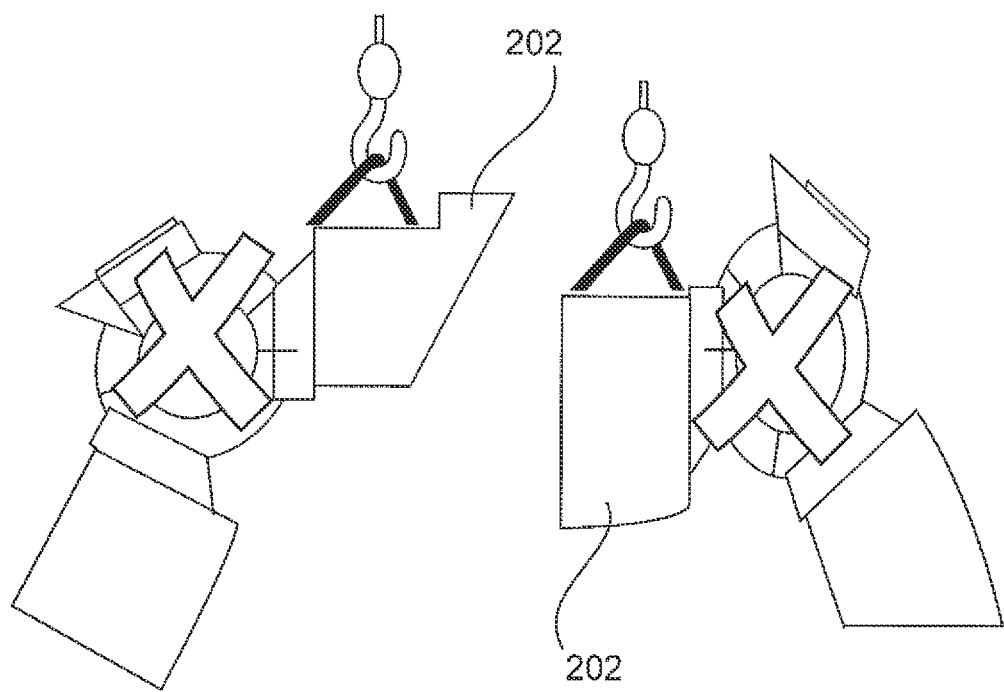
Figure 12:
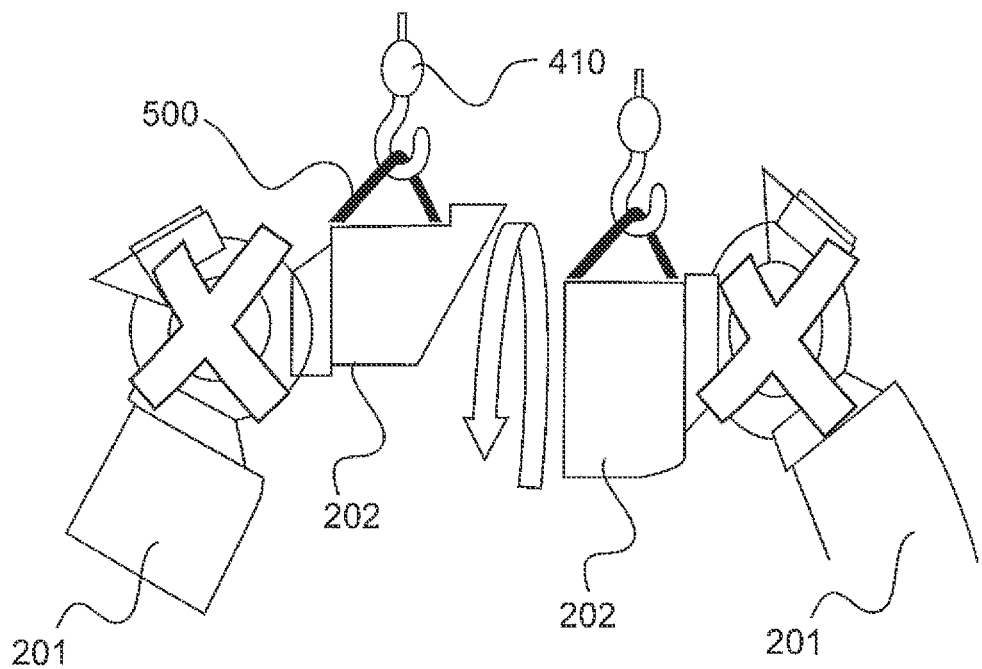
Figure 13:
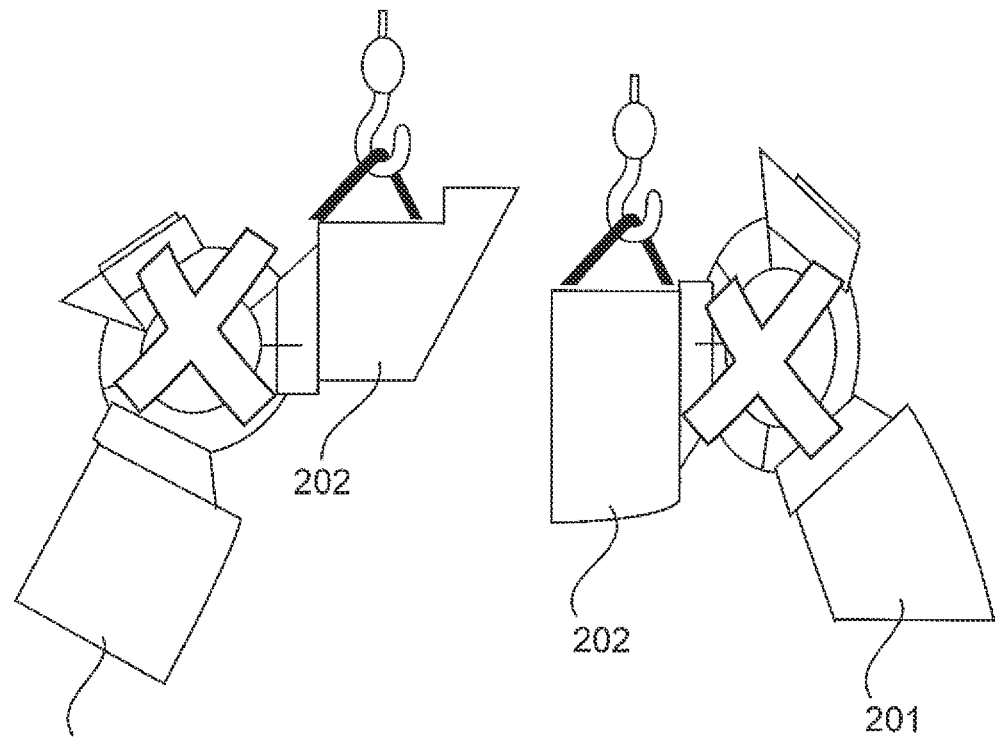

The second rotor blade can thus be correspondingly installed as shown in FIG. 11. FIG. 12 describes installation of the second rotor blade 202. As in the case of the first rotor blade the second rotor blade 202 is fixed to a crane hook by means of a sling 500 and lifted substantially horizontally. The second rotor blade is then fixed to the second rotor blade connection 302. Optionally the rotor blade has to be rotated so that all screw connections can be tightened. Optionally the rotor blade then has to be rotated back again so that the slings and the hooks can be removed again.

Figure 14:
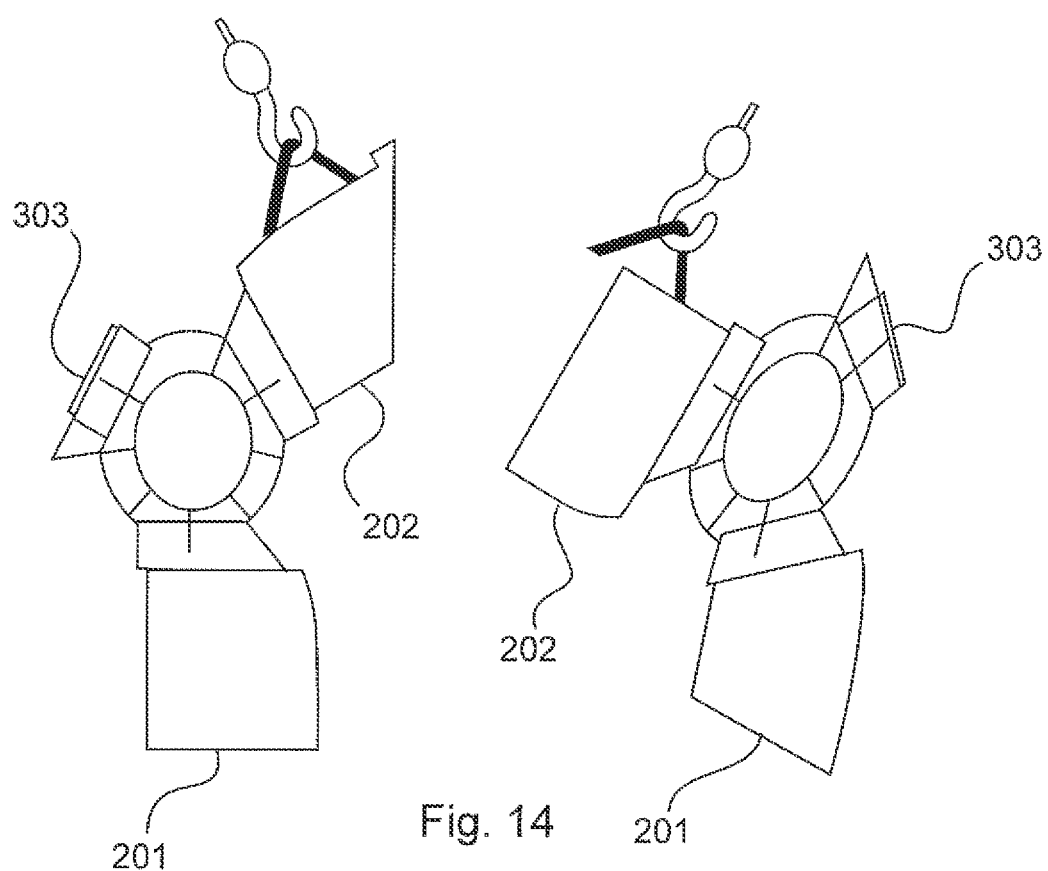
Figure 15:
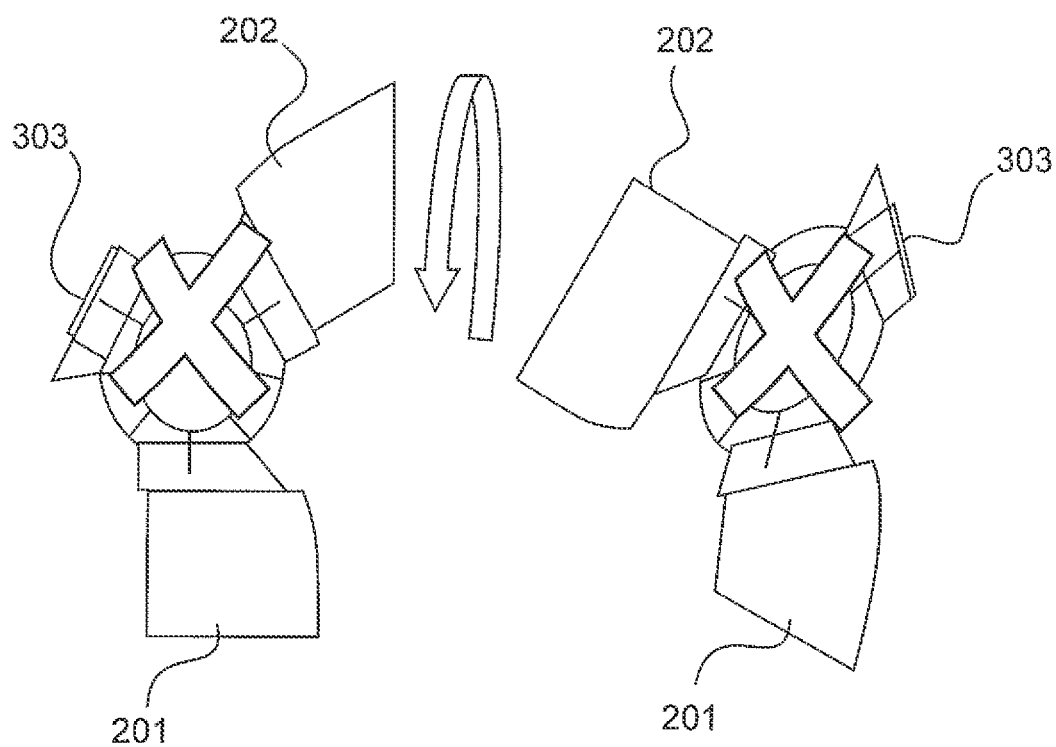
Figure 16:
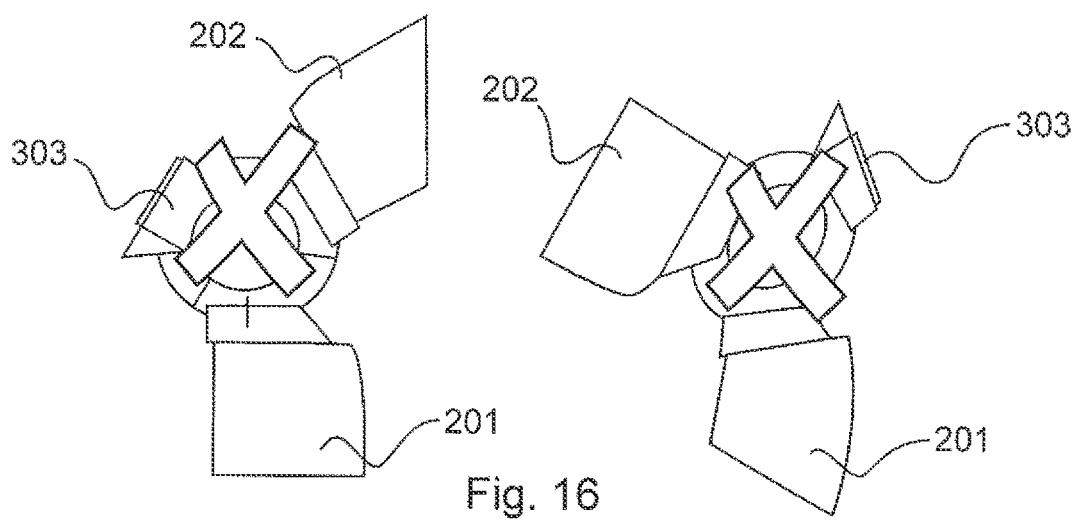
Figure 17:
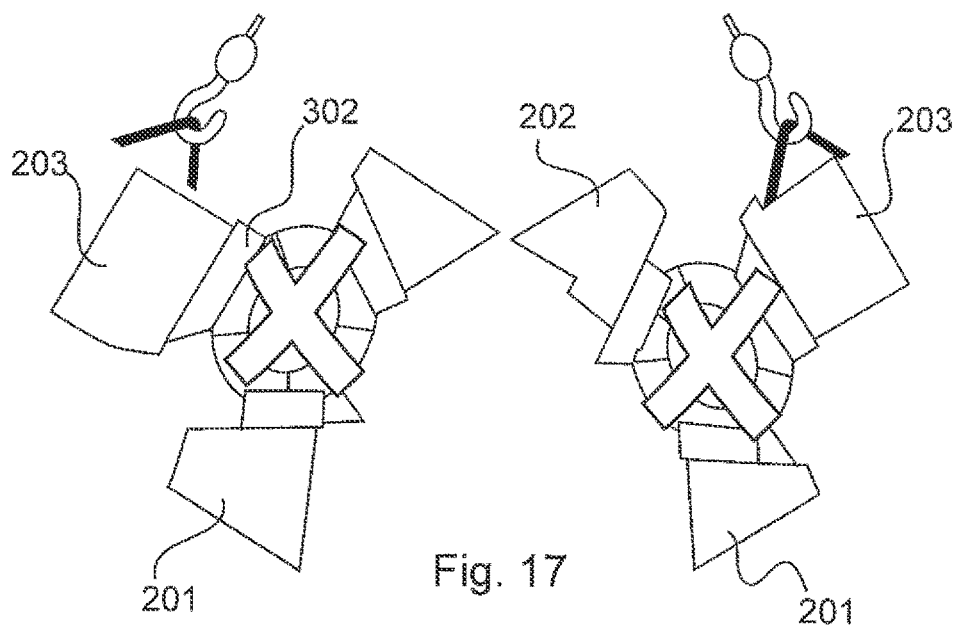
Figure 18:
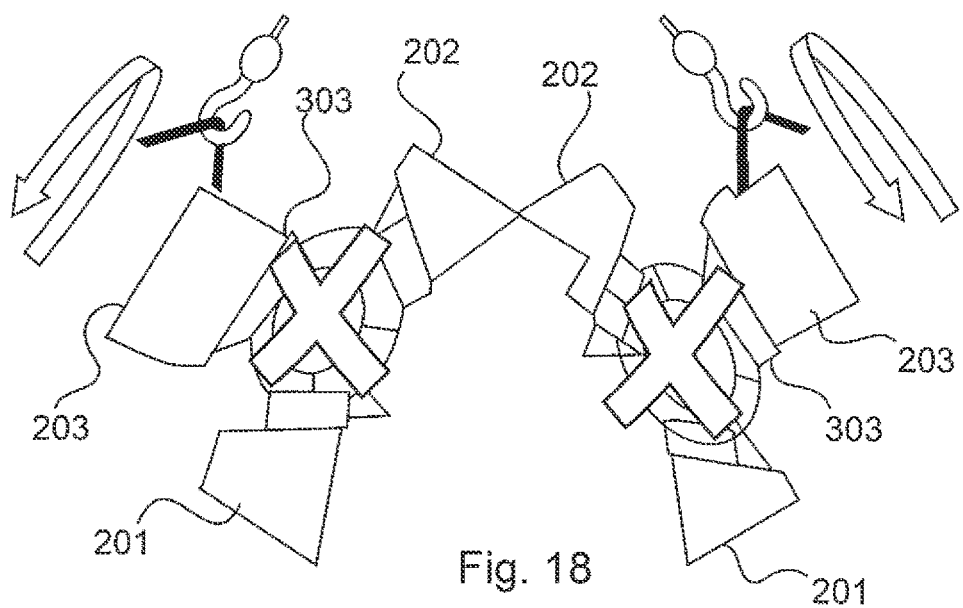
Figure 19:
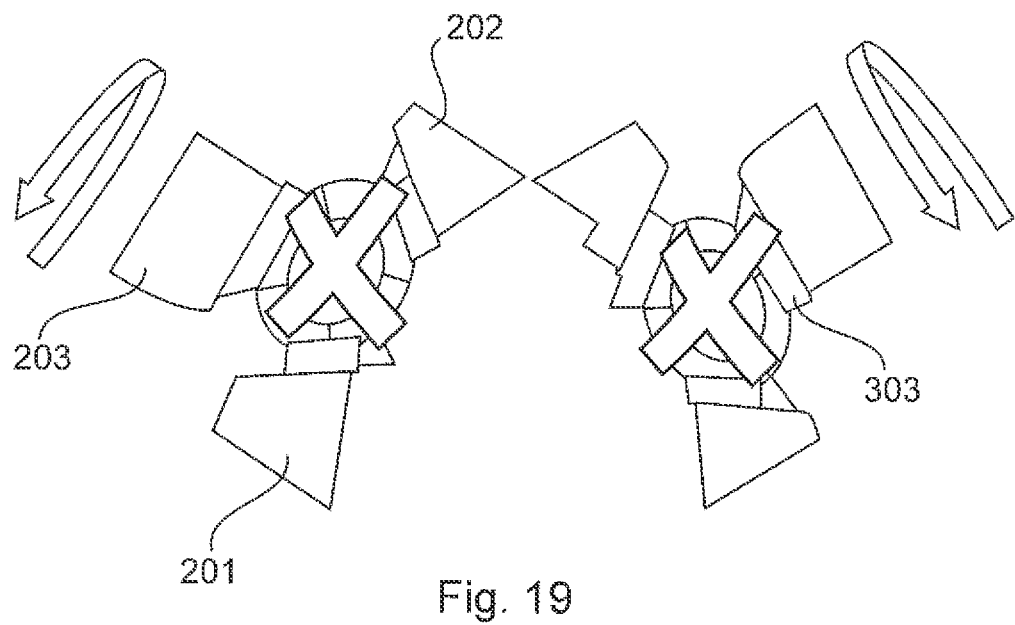
Figure 20:
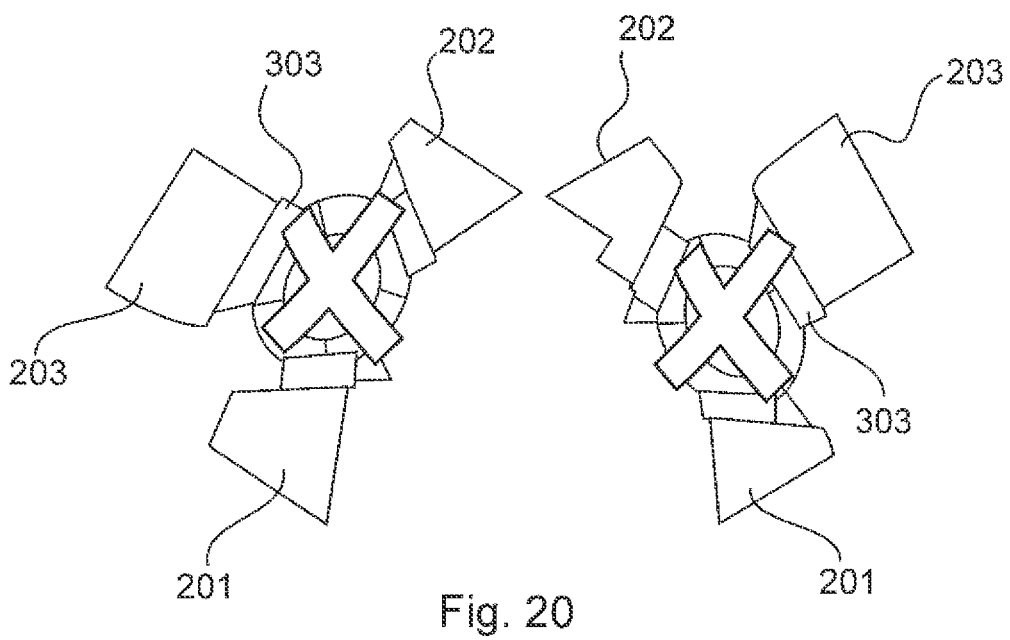
Figure 21:
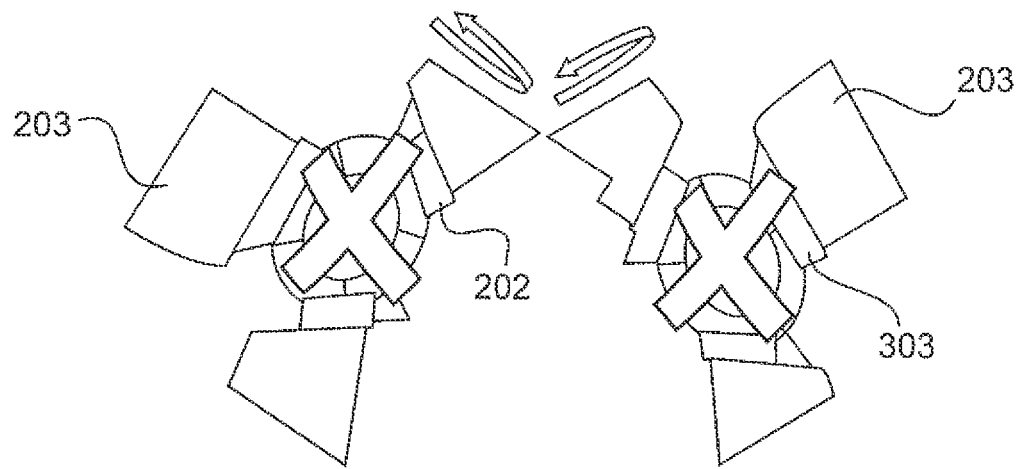
Figure 22:
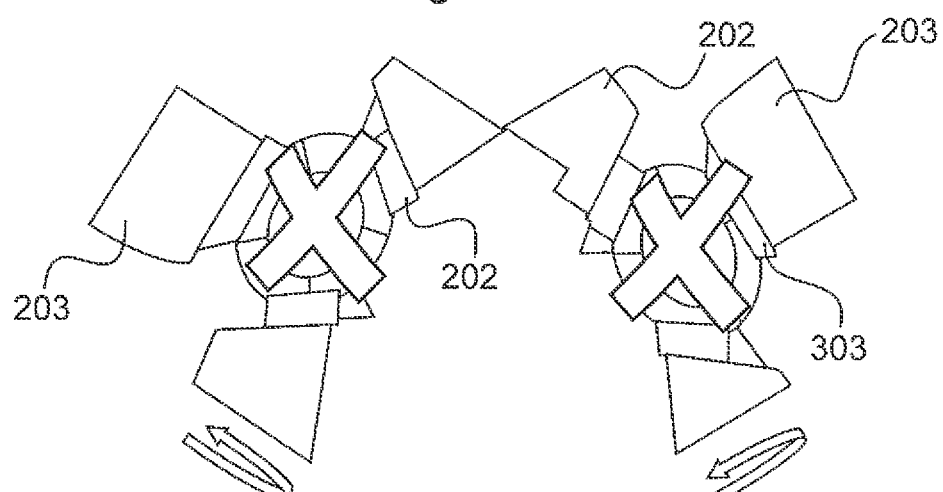

As can be seen from FIGS. 14 and 15 the hub 300 is then rotated in such a way that the first rotor blade is at 180°, that is to say in the 6:00 hour position, and the second rotor blade is then in the 14:00 hour or 22:00 hour position, so that the third rotor blade connection 303 is either in the 14:00 hour or 22:00 hour position. For that purpose the second rotor blade which is already fixed to the hub is lifted by means of the crane through 30° (see FIG. 14). Optionally the blade angle of the second rotor blade can be adjusted in order to be able to tighten all screw connections. In FIG. 16 the second rotor blade is in the defined end position, this can correspond to the defined feather position.

FIGS. 17 to 23 show installation of the third rotor blade 203. The third rotor blade 203 is conveyed upwardly as shown for example in FIG. 4 with a lift angle of 30° and fixed to the third rotor blade connection 303.

Figure 23:
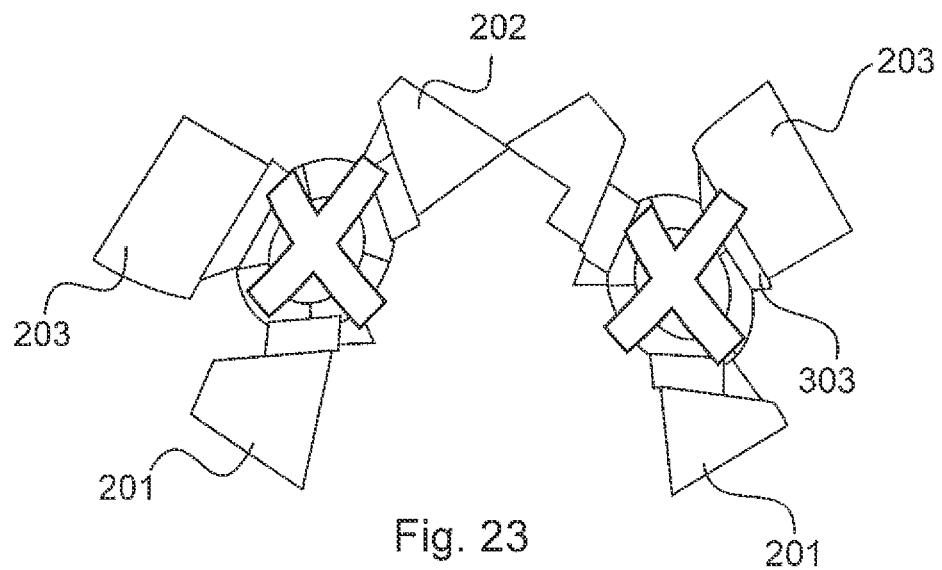

To be able to fix all screws it may be that the blade angle of the third rotor blade has to be adjusted. To conclude the installation steps all rotor blades are rotated into the feather position. As shown in FIG. 23 the rotor arresting action is released and the wind turbine can freewheel.

The invention claimed is:

1. A method of installing rotor blades of a wind turbine on a rotor hub of the wind turbine, wherein the wind turbine has a tower with a tower longitudinal axis, wherein the rotor hub has first, second, and third rotor blade connections, the method comprising:
rotating the rotor hub until the first rotor blade connection is at an angle of 90° or 270° with respect to the tower longitudinal axis,
lifting the first rotor blade substantially horizontally and fixing the first rotor blade to the first rotor blade connection,
rotating the rotor hub so that the second rotor blade connection is at an angle of 90° or 270° with respect to the tower longitudinal axis,
lifting the second rotor blade substantially horizontally and fixing the second rotor blade to the second rotor blade connection,
rotating the rotor hub until the third rotor blade connection is at an angle of 60° or 300° with respect to the tower longitudinal axis,
lifting the third rotor blade at an angle of 30° with respect to a horizontal, and
fixing the third rotor blade to the third rotor blade connection.

2. The method according to claim 1 wherein the first, second, and third rotor blades have a length that is greater than 50 meters, and wherein the rotor hub is at a height that is greater than 100 meters.

\* \* \* \* \*

UNITED STATES PATENT AND TRADEMARK OFFICE
CERTIFICATE OF CORRECTION

PATENT NO. : 11,933,266 B2
APPLICATION NO. : 17/440152
DATED : March 19, 2024
INVENTOR(S) : Florian Rubner et al.

Page 1 of 1

It is certified that error appears in the above-identified patent and that said Letters Patent is hereby corrected as shown below:

On the Title Page

Item [72], "Thomas Rehberger, Grossefehn (DE)", should read: --Thomas Rehberger, Aurich (DE)--.

Signed and Sealed this
First Day of July, 2025

Coke Morgan Stewart
*Acting Director of the United States Patent and Trademark Office*